Sept. 21, 1937.                J. MAIBAUM                2,093,684
            CHANGEABLE EYES AND MOUNTINGS THEREFOR
                    Filed Sept. 23, 1936
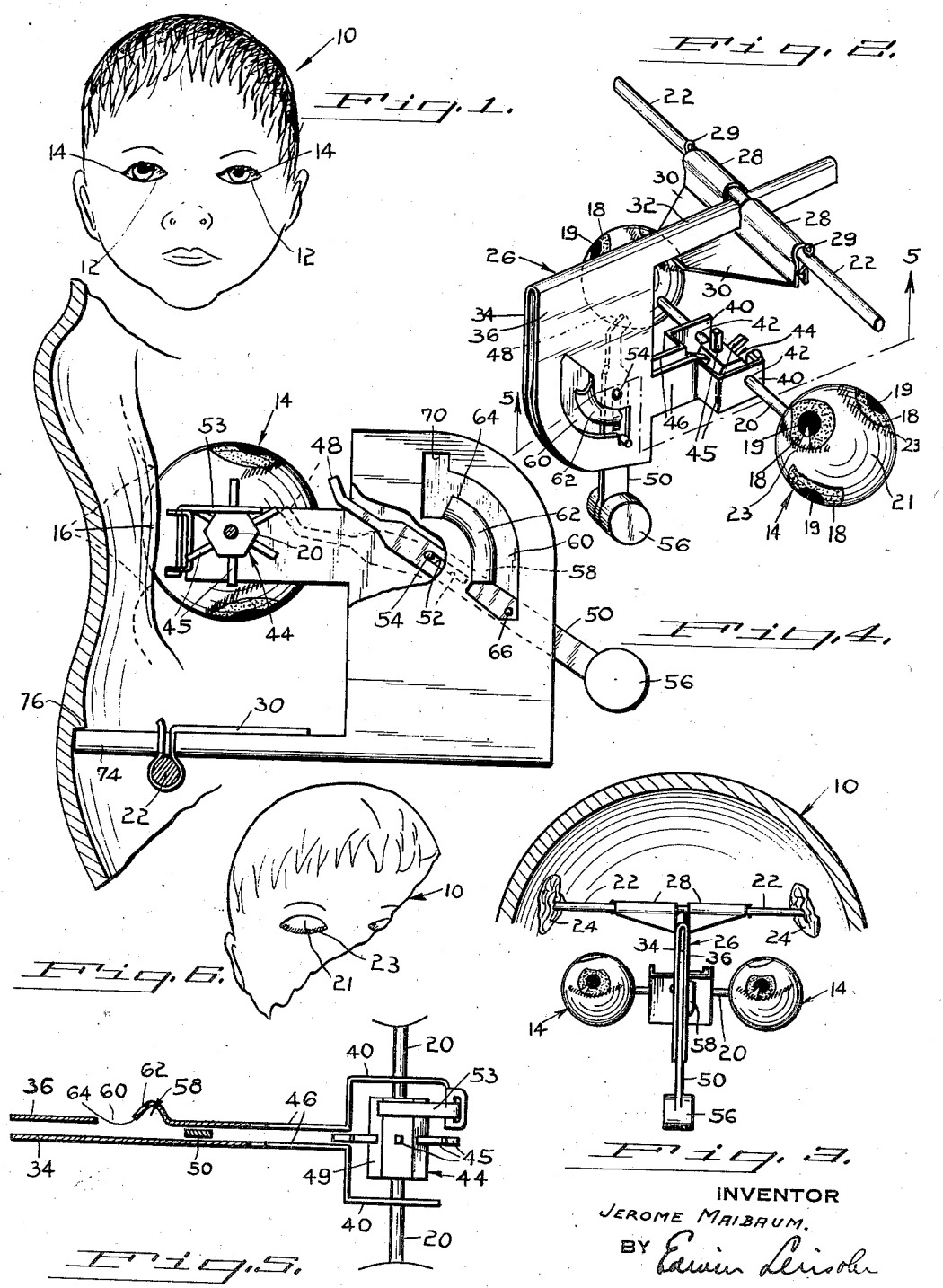
INVENTOR
JEROME MAIBAUM.
BY Edwin Leinske
ATTORNEY Patented Sept. 21, 1937

2,093,684

UNITED STATES PATENT OFFICE 2,093,684

CHANGEABLE EYES AND MOUNTINGS THEREFOR

Jerome Maibaum, New York, N. Y.

Application September 23, 1936, Serial No. 102,101

10 Claims. (Cl. 46—169)

The present invention relates to dolls and other figures, and more particularly, to dolls' eyes and operating mechanisms therefor.

A prime object of this invention is to provide a set of doll's eyes which may be adjusted in the head of a doll for varying the appearance of the eyes exposed to view through the eye apertures. A more specific object in this connection is to provide for this variation, while utilizing only two eye balls, one for each eye of the set.

Another object of the invention is to provide a mechanism for automatically adjusting the eye balls in the doll head with respect to the eye apertures therein by moving the doll head or figure in a predetermined manner.

A further object of the invention is the provision of a unitary mounting for the doll's eyes and the operating mechanism therefor whereby to properly position the eyes in relation to the eye apertures in the doll head.

A further object of the invention is to suspend the mounting in such manner that upon movement of the head for changing the appearance of the eyes, the latter are moved away from the eye apertures to provide a clearance between eyes and apertures during the movement of the eyes with respect to apertures.

The above objects of the invention, objects ancillary thereto, and such other objects as might hereinafter appear, will be more completely understood from the following description considered in connection with the accompanying drawing forming a part of the present specification.

In the drawing:

Fig. 1 is a front view of a doll's head embodying the present invention;

Fig. 2 is a perspective view, on a larger scale, of the doll's eyes and operating mechanism, removed from the head;

Fig. 3 is a rear view of the inside of the doll's head showing the unit mounted therein;

Fig. 4 is a view partly in elevation and partly in section, showing the doll head in inverted position and illustrating the position of the parts just after the eyes have been moved by the operating mechanism to change their appearance;

Fig. 5 is a sectional view on the line 5—5 of Fig. 4;

Fig. 6 is a front view of part of the doll's head illustrating the appearance of one of the eye balls to simulate a sleeping child.

Referring to the drawing in detail, the doll head 10 is provided with the usual eye apertures 12 through which the doll's eyes 14 are visible. Portions of the inner surface of the doll's head adjacent said apertures are shaped to provide eye socket portions 16, providing recesses conforming to the contour of the eye balls, the latter normally engaging said sockets or recesses for obtaining proper registry of the eye balls with the eye apertures 12.

As here shown, the eye balls 14 are spherical and each comprises a plurality of irises 18, their and each comprises a plurality of irises 18, their pupils 19, and eyelashes 23. These irises are positioned on different surface portions of the eye balls in spaced relation thereon in such manner that upon rotation of the eye balls with relation to the companion eye apertures, different irises on the eye whites 21 are exposed to view through said apertures. It will be understood that the irises on one eye ball will be positioned in predetermined relation to the irises upon the other eye ball of the set whereby to obtain the desired appearance of the two eyes exposed to view at any one time through the eye apertures. These irises are of such color and configuration, and are so positioned on the eye balls, as to provide for a plurality of different appearances of the eyes depending upon the set of irises in registry with the eye apertures. Thus, for example, some of the irises may be of one color, say blue, and some of the irises may be of another color, for example, brown, and they may be positioned on the eye balls so that when they are in registry with the eye apertures the eyes have a normal appearance of the desired color. Some of the irises may be positioned on the eye balls in such relation that when they are in registry with the apertures the eyes have an abnormal appearance, as for example, simulating cross eyes. Further, the irises may be of such configuration and may be so positioned on the eye balls that when such irises are in registry with the eye apertures the eyes of the doll have a wistful, thoughtful or other expression.

The eye balls 14 are mounted in spaced relation on a rod 20. Said eye balls are fixed to the rod 20 and are rotatable therewith as a unit for adjusting the position of the eye balls in the sockets whereby to expose any desired set of irises to view through the eye apertures 12. Although the eye balls may be moved by hand by engaging them through the apertures, as will be described presently, the eye balls are preferably operated by a mechanism provided for that purpose and are automatically actuated when the doll head is inverted from an upright position through an arc of about 180° during which motion of the doll's head said mechanism is effective to rotate the rod 20 a predetermined amount to bring a particular set of irises into registry with the eye apertures. As illustrated in Fig. 6, eyewhite portions of the eye ball may be arranged to simulate the eyelid. Thus, when the eyewhite portion 21 is in registry with the eye apertures, the eyelash 23 is at the lower edge of said aperture so that the figure simulates a sleeping child. The eyelid portion may thus be visible when the figure is in upright position or when the figure is in horizontal position.

The rod 20 and the operating mechanism referred to are mounted as a unit in the head of the doll. In addition to the rod 20 carrying the eye balls 14, the unit comprises a rod 22 by which the unit is supported in the doll head. Said rod 22 is fixed in position above the eye apertures to the sides of the doll's head in such position that the eye balls 14 are received in the sockets 16 on the inside of the doll head. The ends of the rod 22 may be fixed and positioned in any suitable manner as by small masses 24 of suitable plastic material which sets and adheres to the adjacent portions of the doll head and the rod 22.

A bracket 26 made of thin sheet metal is carried by the rod 22 and is pivotally mounted thereon. For this purpose, said bracket is provided with upper bearing portions 28 which rotatably engage said rod. The bracket is held against longitudinal movement by pins 29. Said bearing portions 28 are reinforced by integral web members 30 which are also integral with the U-shaped portion 32. Spaced plates 34 and 36 are integral with said U-shaped portion 32 and depend from its rear end. The plates 34 and 36 are provided with forwardly projecting integral bearing portions 40 having aligned apertures 42 in which the rod 20 is journalled for rotation. A toothed wheel 44 is fixed to the rod 20 and is positioned between the bearing portions 40, the teeth of said wheel being movable between the integral connecting straps 46 whereby the rod 20 is centered with respect to the bracket. The space between said straps 46 is but slightly greater than the thickness of said teeth whereby to substantially prevent the rod 20 from moving longitudinally of the bearing portions 40 and to maintain said teeth in alignment with the spaces between said straps 46. The teeth 45 of the wheel 44 are engaged by the end 48 of a lever 50 which is rotatably and slidably mounted in the bracket 26 between the plates 34 and 36. Said lever 50 is provided with a slot 52 which engages a pivot pin 54 extending between the plates 34 and 36. Thus the lever 50 can rotate on the pin 54 and also can move transversely of said pin for engaging the lever end 48 with the teeth 45 and for releasing said lever end from such engagement. The opposite end of the lever 50 is provided with a weight 56 which maintains the lever 50 substantially in vertical position.

The plate 36 of the bracket 26 is provided on its inner surface with an arcuate groove 58 which is open at both ends and communicates with an arcuate slot 60. Said groove 58 is formed in an outwardly bent portion 62 of the plate 36 and terminates at its free side in a curved edge 64 which defines one side of the slot 60. The ends of the portion 62 terminate in spaced relation to the ends of the slot 60. The lever 50 is provided with a pin projection which engages in the groove 58 and slot 60. At its forward end the slot 60 is provided with a recess 70 which is engaged by the lever pin projections 66 in one position of said lever. The wheel 44 is provided with a hub portion 49 having a hexagonal surface. A flat spring 53 fixed at one end with the bearing portion 40 is arranged to resiliently and releasably engage parts of said hexagonal surface to releasably hold the rod 20 in position when the desired surface portions of the eye balls are in proper registry with the eye apertures.

Briefly the operation of the mechanism is as follows: Assuming that the doll is in upright position, the parts of the mechanism assume the position illustrated in Fig. 2, a predetermined set of irises being in registry with the eye apertures 12, and the pin projection 66 being in the recess 70 for releasably holding the parts in this position. When the doll is moved to inverted vertical position, the lever 50 moves transversely of the pivot pin 54 and the pin projection 66 moves into alignment with the adjacent end of the groove 58, and then moves longitudinally of said groove thereby rotating the lever about the pivot pin 54. During this rotation of the lever, the end 48 thereof engages one of the teeth 45 of the wheel 44 and thereby rotates the rod 20 one step bringing the succeeding set of irises into registry with the eye apertures 12. At the end of the pivotal movement of the rod for rotating the wheel 44 the lever reaches the rear end of the groove 58, and the pin projection 66 registers with the rear offset portion of the slot 60. This permits the lever to slide in relation to the pivot pin 54, and the pin projection 66 enters the slot 60 whereupon due to the action of gravity the lever is free to rotate in the opposite direction to the opposite end of the slot where the pin projection 66 enters the recess 70 and in that position is restrained from further movement. It will be observed that the lever is first slidably operated to engage one end thereof with the teeth on the wheel 44, then rotated in one direction to rotate the eyes a predetermined amount to bring a set of irises into registry with the eye apertures, after which the lever is moved in the opposite direction, first slidably to disengage the end of the lever from the tooth wheel and then pivotally to condition the mechanism for the next operation. It will be observed that the movement of the eyes takes place during the movement of the figure from upright vertical position to inverted vertical position and that no movement of the eyes takes place when the figure is moved to upright position. The spring 53, which engages the hub 49 releasably holds the rod 20 in proper position for aligning the successive sets of irises or other eye ball portions with the eye apertures.

In accordance with the present invention, provision is made for clearance between the eye balls and the eye sockets during the rotation of the eye balls. It is for this reason that the bracket 26 is pivotally mounted upon the rod 22. As clearly shown in the drawing, the unit is suspended in such manner that when the figure is inverted, the bracket and the parts carried thereby swing toward the rear on the rod 22 thus moving the eye balls out of engagement with their sockets. This movement is limited by the engagement of the projection 74 integral with the forward end of the bracket 26 with a stop 76 on the inner surface of the doll head above the eye apertures.

It is thus seen that the construction herein shown and described as the preferred embodiment of the present invention is well adapted to accomplish the objects of the latter. While I have shown complete irises and complete normally visible eye ball portions arranged to register with the eye apertures, it will be understood that parts of irises and parts of the eye may be made visible through the apertures. For convenience in reference in the claims, I have referred to the iris but it will be understood that the term "iris", unless otherwise stated in the claims, designates any part of the iris or any portion of the eyeball including the eyelash depicted thereon. It will be understood also that instead of varying the appearance of the eyes, the mechanism shown and described herein for that purpose may be used for varying the appearance of the teeth. It will be understood that the invention is capable of other embodiments than the one herein specifically illustrated or described, and that certain changes in the construction and arrangement of parts may be made in the present embodiment. Therefore, I do not wish to be limited precisely to the present construction, except as may be required by the appended claims considered with reference to the prior art.

Having thus described my invention what I claim and desire to secure by Letters Patent is:

1. In a figure device, a head having an eye aperture and an eye mounted in said head visible through said aperture, said eye comprising an eye ball having a plurality of differently appearing irises on different spherical surface portions thereof and said eye ball being rotatable whereby to selectively expose to view through said aperture any one of a plurality of different eye ball surface portions and the iris associated therewith, for varying the appearance of the eye visible through said aperture, means for automatically rotating said eye ball upon movement of the head in a predetermined direction, and means for moving the eye ball away from said aperture during the rotation of the eye ball.

2. In a figure device, a head having eye apertures, eyes rotatably mounted in said head adjacent said apertures, and means for rotating said eyes comprising a rod to which said eyes are fixed, means including a rotatable and slidable member for rotating said rod, and means operative upon a predetermined movement of the figure first to cause said member to slide and then to rotate whereby said eyes are rotated a predetermined amount automatically in response to said movement of the figure.

3. In a figure device, a head having eye apertures, eyes rotatably mounted in said head adjacent said apertures, and means for rotating said eyes comprising a rod to which said eyes are fixed, means including a toothed wheel fixed to said rod and a lever movable transversely of said rod in one direction to engage said toothed wheel to thereby rotate said rod and the eyes carried thereby and in another direction to release said toothed wheel, and means for actuating said lever automatically upon movement of the figure in a predetermined direction.

4. An eye mechanism for a doll or other figure comprising a bracket, a rod rotatably carried by said bracket, eyes carried by said rod and rotatable therewith, and means for rotating said rod comprising interengaging means on rod and bracket including a member slidably and pivotally carried by said bracket.

5. An eye mechanism for a doll or other figure comprising a bracket, a rod rotatably carried by said bracket, eyes carried by said rod and rotatable therewith, said bracket having a plurality of guide slots, a lever pivotally and slidably mounted in said bracket and having a part engageable in said slots, and means on said rod engaged by said lever for rotating said rod when said lever part is in one of said slots and released from said lever when said lever part is in the other of said slots.

6. In a figure device, a head having a pair of eye apertures, means for mounting a pair of eyes in said head for rotation adjacent said apertures, and means for moving said eyes away from said apertures to provide a clearance between the eyes and the aperture edges during the rotation of the eyes.

7. In a figure device, a head having a pair of eye apertures, a pair of eyes rotatably mounted in said head adjacent said apertures, each of said eyes comprising an eye ball member carrying on its surface a plurality of irises in spaced relation, means for rotating said eye ball members to bring different sets of irises into registry with said apertures, and means for moving said eyes away from said apertures to provide a clearance between the eyes and the aperture edges during the rotation of the eyes.

8. In a figure device, a head having eye apertures, eyes rotatably mounted in said head adjacent said apertures, and means for rotating said eyes comprising a rod to which said eyes are fixed, means including a rotatable and slidable member for rotating said rod, means operative upon a predetermined movement of the figure first to cause said member to slide and then to rotate whereby said eyes are rotated a predetermined amount automatically in response to said movement of the figure, and means for mounting said eyes and said eye-rotating means as a unit in said head.

9. In a figure device, a head having eye apertures, eyes rotatably mounted in said head adjacent said apertures, and means for rotating said eyes comprising a rod to which said eyes are fixed, means including a toothed wheel fixed to said rod and a lever movable transversely of said rod in one direction to engage said toothed wheel to thereby rotate said rod and the eyes carried thereby and in another direction to release said toothed wheel, means for actuating said lever automatically upon movement of the figure in a predetermined direction, and means for mounting said eyes and said eye-rotating means as a unit in said head.

10. In a figure device, a head having a pair of eye apertures, and an eye unit carrying a pair of eye balls movably mounted in said head in position so that said eye balls register with said apertures, said unit being rotatably mounted and suspended in said head off its center of gravity in such manner that said eye balls automatically assume a position in close proximity to said apertures when the figure is in vertical upright position, said eye balls having a limited movement away from said apertures when the figure is moved to inverted vertical position.

JEROME MAIBAUM.